United States Patent [19]

Van den Bussche

[11] 3,823,260

[45] July 9, 1974

[54] COLOUR TELEVISION CAMERA

[75] Inventor: Willem Van den Bussche, Emmasingel, Eindhoven, Netherlands

[73] Assignee: U.S. Philips Corporation, New York, N.Y.

[22] Filed: Nov. 27, 1972

[21] Appl. No.: 309,708

[30] Foreign Application Priority Data

Dec. 4, 1971 Netherlands ...................... 71.16690

[52] U.S. Cl. .......................... 178/5.4 ST, 178/5.4 E

[51] Int. Cl. ............................................ H04n 9/06

[58] Field of Search ...................... 178/5.4 ST, 5.4 E

[56] References Cited

UNITED STATES PATENTS 3,553,356 1/1971 Groll ............................ 178/5.4 ST 3,588,224 6/1971 Pritchard ........................ 178/5.4 ST

*Primary Examiner*—Richard Murray

*Attorney, Agent, or Firm*—Frank R. Trifari; Henry I. Steckler

[57] ABSTRACT

A colour television camera using one camera tube onto which three separate differently coloured images are projected beside one another in the line scan direction. Compressed images are made on either side of the normal central image through compression optical systems in the line scan direction. The central image is analysed during each line period in the standard line scan period and a compressed image is analysed one line every two lines in part of the standard line blanking period. After signal expansion of the compressed signals simultaneous image signals are obtained with the aid of a delay unit.

11 Claims, 3 Drawing Figures

COLOUR TELEVISION CAMERA

Figure 1:
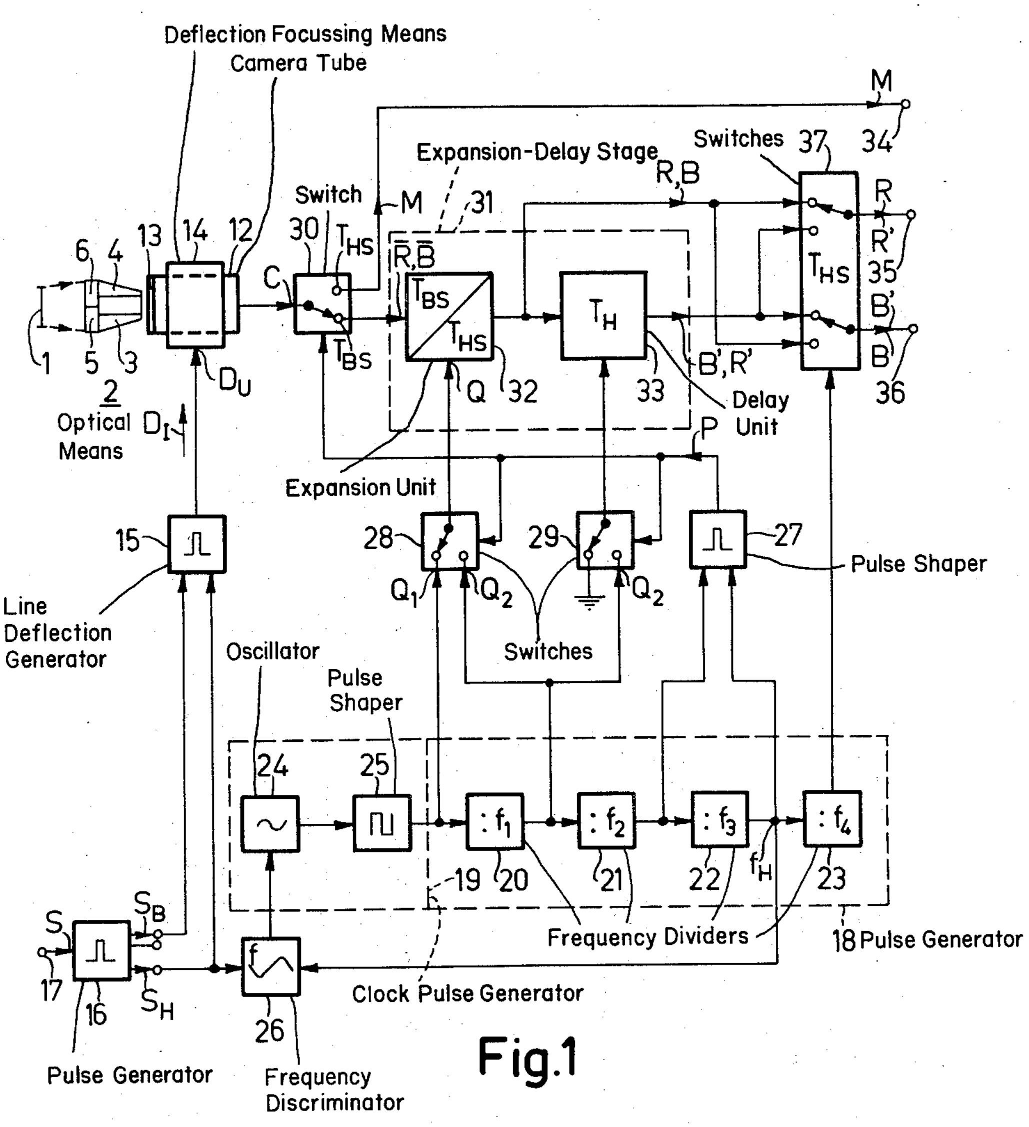

The invention relates to a colour television camera provided with optical means through which separate, differently coloured images of a scene to be picked up are projected onto one pick-up device which pick-up device converts the optical images into electrical signals through a line-by-line and field-by-field analysis, while a plurality of images is converted successively during one line analysis, said camera being formed with a signal expansion-delay stage to convert the sequentially generated electrical signals into simultaneous image signals in accordance with a television standard having a given line scan and line blanking period.

A camera of this kind is proposed in U.S. Pat. No. 3,553,356. Three equally large images are projected onto the pick-up device formed as a television camera tube, which images correspond to the red, green and blue colour component in the light coming from the scene. During each line scan period determined by the television standard each image is analysed for approximately one third of the line scan period. The three signals thus sequentially generated are each applied to a signal expansion-delay stage. A signal conversion is effected in each of the three expansion-delay stages while the time of occurrence of a signal is increased from one third to an entire line scan period and a determined signal delay is given in order that three simultaneous image signals result.

As compared with the conventional signal generation during an entire standard line scan period, the three image signals occurring as colour signals and being each generated for approximately one third of the line scan period have a reduced frequency range. It has been described that a camera suitable for practice is formed with a second camera tube which separately generates a so-called luminance signal in the conventional manner. The reason thereof is that the frequency limitation admissible for the colour signals is inadmissible for a luminance signal composed of the colour signals because a reduction in definition in the line scan direction which is unacceptable to the eye occurs when the scene is displayed. In fact, the eye is more sensitive to details in brightness than in colour.

The luminance signal only displayed in case of monochrome operation must also have a sufficiently high frequency range on the ground of compatability requirements between monochrome and colour television display. If this were not the case because, for example, the luminance signal is constituted by the three frequency-limited colour signals, the luminance signal would yield an inadmissible vague image which is poor in detail when it is displayed on a monochrome display apparatus.

It is found that the described colour television camera is to be formed in practice with two pick-up devices and with three expansion-delay stages.

An object of the invention is to provide a color television camera which has only one pick-up device and one or not more than two expansion-delay stages and which yields image signals by which an image which is rich in detail is obtained both in case of monochrome display and colour television display. To this end a colour television camera according to the invention is characterized in that the analysis of a compressed image of the scene on the camera, obtained through a compression-optical system included in said optical means for reducing one of the scene images is effected during part of the line blanking period of the standard and the analysis of a non-compressed image is effected during the line scan period of the standard.

The invention is based on the recognition of the fact that it is quite possible to process not only the information of the scene during the normal standard line scan periods, but that this may alternatively be effected during part of the line blanking period which is normally not further used after an optical compression has been carried out. A satisfactory compatability of monochrome and colour television display is then ensured because a non-compressed image is analysed in the conventional manner during the standard line scan period.

Figure 2:
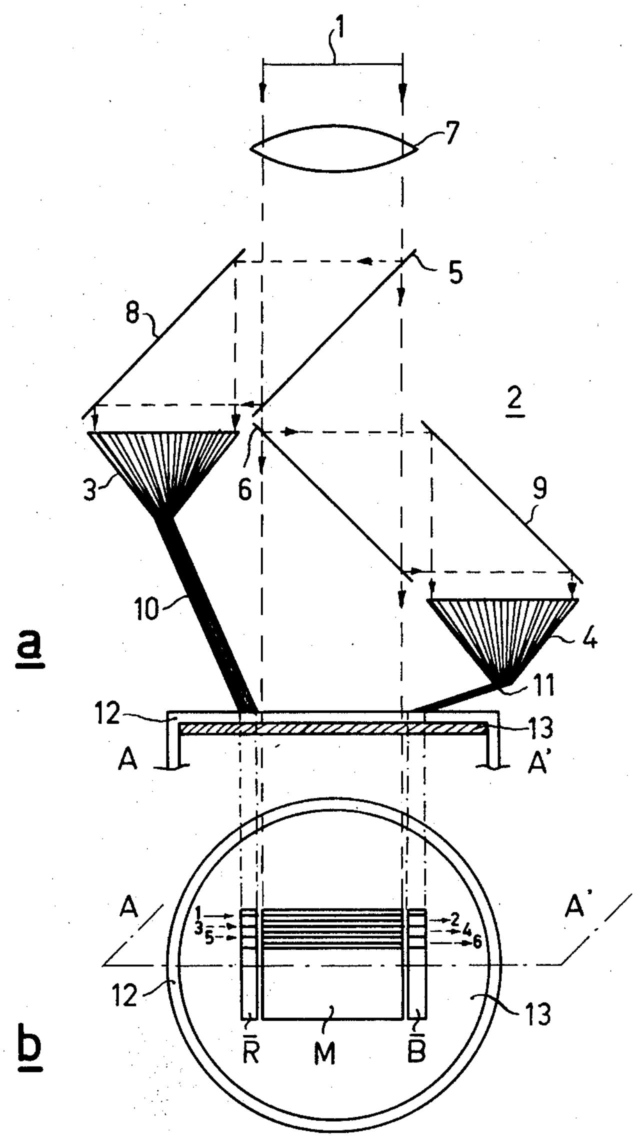
Figure 3:
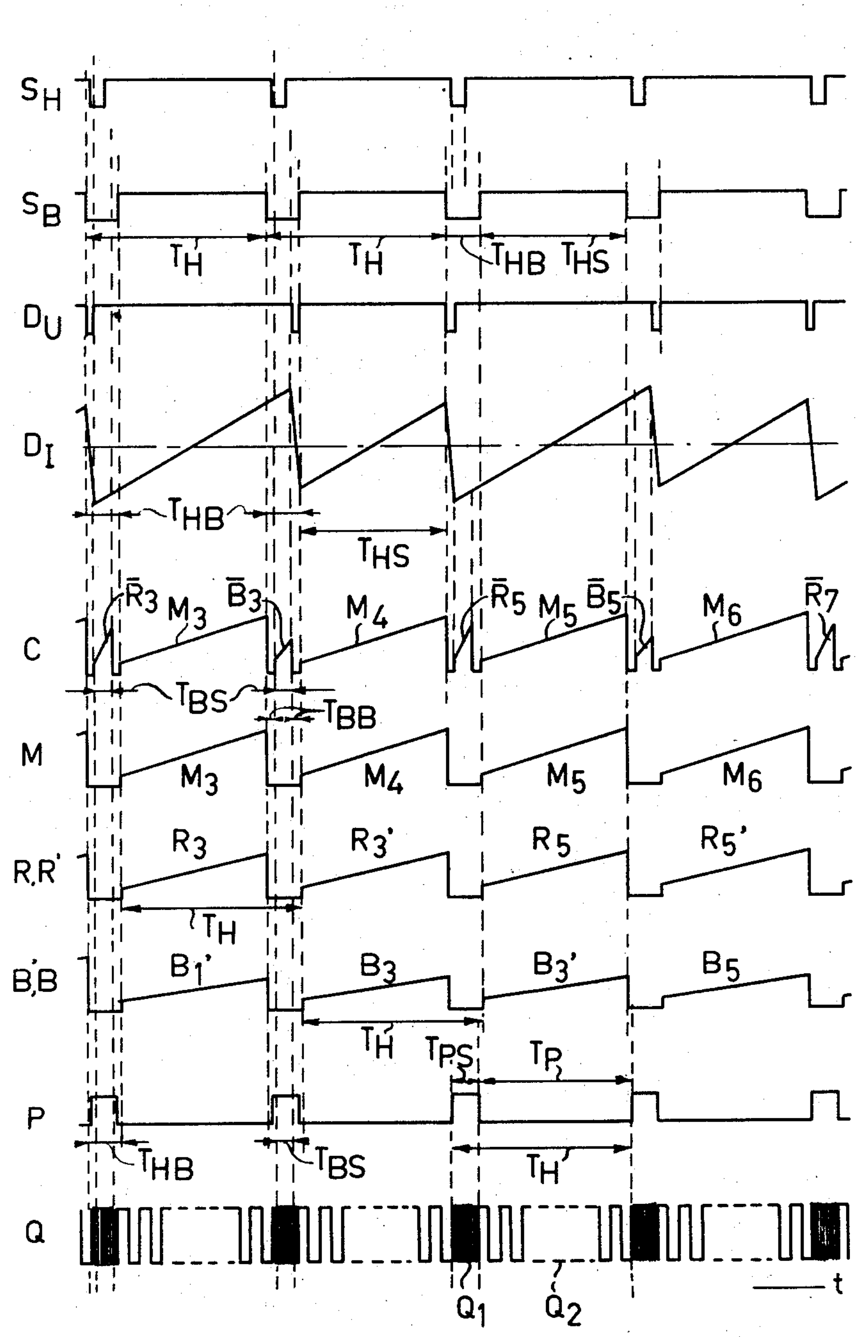

The invention will be described in detail with reference to the following figures as examples in which FIG. 1 shows a block diagram of an embodiment of a colour television camera according to the invention employing one pick-up device and one signal expansion-delay stage, FIG. 2 explains the operation of the camera according to FIG. 1 by way of a diagram of an embodiment of optical means and the result thereof, and FIG. 3 shows as a function of time some signals associated with FIGS. 1 and 2.

In FIG. 1, 1 denotes a scene which is picked up by a colour television camera according to the invention. The camera is provided with optical means 2 some components of which are furthermore denoted such as two compression-optical systems 3 and 4 and associated colour filters 5 and 6 each having a different light transmission characteristic.

FIG. 2*a* diagrammatically shows a more detailed embodiment of the optical means 2. According to FIG. 2*a* the light coming from the scene 1 is incident through a lens 7 on two colour filters 5 and 6 which are placed behind each other and which are formed as semipermeable mirrors. Colour filter 5 reflects, for example, 10 percent of the red light present in the light of the scene towards a mirror 8 which directs this red light onto the compression-optical system 3. Colour filter 6 reflects, for example, 10 percent of the blue light coming from the scene 1 towards a mirror 9 which directs this light onto the compression-optical system 4. The compression-optical systems 3 and 4 are shown in FIG. 2*a* as fibre optical elements which, with fibres becoming narrower into one direction, compress the incident light into this direction to, for example, one eighth. After the light compression by the optical systems 3 and 4 fibre strands 10 and 11 formed with a constant cross-section pass on the compressed red and blue light from the scene 1. The compression-optical systems 3 and 4 instead of being formed with fibres may alternatively be formed with a system of lenses or with curved mirrors.

The light passes by the colour filters 5 and 6 is incident on a pick-up device formed as a camera tube 12 while bypassing the compression-optical systems 3 and 4 hence without compression. The pick-up device, instead of being formed as a camera tube 12, may alternatively be formed as a pick-up panel which is constituted with photosensitive components. In the camera tube 12 the reference numeral 13 denotes a so-called target plate which is built up of a transparent electrically conducting signal plate not further shown and, for example, a photosensitive semiconductor layer. Other embodiments such as, for example, photosensitive diodes are possible. It is only of importance that an image of the scene 1 projected onto the target plate 13 provides a potential image on the free surface of the target plate 13 which is analysed through an electron beam (not shown) in the camera tube 12 into a line-by-line and field-by-field scan and which causes the camera tube 12 to produce an associated electrical signal.

To explain the operation of the optical means 2 with the compression-optical systems 3 and 4 according to FIGS. 2*a*, FIG. 2*b* shows a front view of the camera tube 12. The line A–A′ shows a line of cross-section. In FIG. 2*b* M shows the region of the non-compressed image of the scene 1. The light coming from the scene minus 10 percent of the red and 10 percent of the blue light component is incident on the region M; the incident light thus has a greenish tint. The references $\bar{R}$ and $\bar{B}$ denote regions onto which the compression-optical systems 3 and 4 are directed through the strands 10 and 11 of FIG. 2*a*. For the region $\bar{R}$ and $\bar{B}$ 10 percent of the red and 10 percent of the blue light component is split off the light from the scene, which 10 percent after compression with a compression factor equal to eight is increased to a local light intensity of 80 percent. Local light intensities in the regions $\bar{R}$, M and $\bar{B}$ are then of the same order which is favourable for the analysis because it leads, inter alia, to a better signal-to-nois ratio.

The line-by-line and field-by-field analysis or scanning of the regions $\bar{R}$, M and $\bar{B}$ shown in FIG. 2*b* is effected in camera tube 12. For some line analysises enumerated 1 to 6 arrows show the line scan direction. The normally used one-to-two line interlacing has not been taken into account in this enumeration but successive line scans in one line field carry successive numerals. For the common separation into odd and even fields the lines 1, 2, 3, 4, 5 and 6 enumerated in accordance with FIG. 2 would occur as line 1, 3, 5, 7, 9 and 11 in the odd field and as lines 2, 4, 6, 8, 10 and 12 in the even field. Since this is of no importance for the description of the invention the enumeration given in FIG. 2b has been chosen for the sake of simplicity.

FIG. 2b shows that the line scans are effected in an unconventional manner. For the scans 1, 3 and 5 all three of the regions $\bar{R}$, M and $\bar{B}$ are covered while for the scans 2, 4 and 6 only the region M is analysed. To explain the special scanning method, FIG. 1 will be described in conjunction with the signals according to FIG. 3.

In FIG. 1 means 14 are shown near the camera tube 12 which comprise, inter alia line deflection coils, field deflection coils, a focussing coil etc. It is important for the Application that the means 14 cause the line-by-line and field-by-field deflection of the electron beam (not shown) in the camera tube 12. The means 14 are connected, inter alia, to a line deflection generator 15 which is controlled from a pulse generator 16. Pulse generator 16 is connected to an input 17 of the colour television camera to which a synchronizing signal S is applied. Signal S may be a coded digital signal or may be built up in a different manner. In any case pulse generator 16 can generate a line synchronizing signal $S_H$ and a line blanking signal $S_B$ associated with a television standard, which signals are plotted as a function of time *t* in FIG. 3. For the signal $S_B$ periodical line periods according to the standard are denoted by $T_H$ and a standard line scanning period is denoted by $T_{HS}$ and a standard line blanking period is denoted by $T_{HB}$. The instants of beginning and end of the periodically occurring line period $T_H$ is chosen arbitrarily which is also apparent from some further signals shown in FIG. 3: the standard duration is of importance only.

Under the influence of the signals $S_H$ and $S_B$ from generator 16 of FIG. 1 generator 15 generates a voltage denoted by $D_U$ for the means 14. As a result of the voltage $D_U$ which is impressed on the line deflection coils present in means 14 through a capacitor not shown, a line deflection current denoted by $D_I$ is obtained in the coils. In FIG. 3 the standard line scan period $T_{HS}$ is denoted for the deflection current $D_I$ during which period line scanning normally takes place. It is found that the line scanning during one scan period before and after the said time $T_{HS}$ lasts longer. During these scan periods the line scan is started in an unconventional manner at an earlier instant during a standard line blanking period $T_{HB}$ and is continued until a subsequent standard line blanking period $T_{HB}$.

Under the influence of the line deflection current $D_I$ the camera tube 12 of FIG. 1 generates a signal C whose composition shown in FIG. 3 follows from the regions $\bar{R}$, M and $\bar{B}$ shown in FIG. 2*b*. In the signal C the result of some line scans is denoted by $\bar{R}_3$, $M_3$, $\bar{B}_3$, $M_4$, $\bar{R}_5$, $M_5$, $\bar{B}_5$, $M_6$ and $\bar{R}_7$ in which the figure denotes the line member (FIG. 2*b*). For the sake of simplicity it has been assumed that the scene 1 has a continuously increasing light intensity as viewed in the line scan direction for the given colours. As has been described hereinbefore the amplitudes of the signals $\bar{R}$ and $\bar{B}$ relative to M are of the same order due to the chosen product term of light splitting percentage and compression factor.

It follows from signal C of FIG. 3 that during the standard line blanking period $T_{HB}$ the line scan and line analysis is effected for a time $T_{BS}$. Prior to and after each scan period $T_{BS}$ there is a period $T_{BB}$ in which either the line scan continues while there is no line analysis or the line flyback is effected as is apparent from the voltage $D_U$ and current $D_I$. A (real) continuing line scan without actual line analysis may be obtained by providing a black strip between the regions $\bar{R}$ and M and M and $\bar{B}$ of FIG. 2*b*. A pseudo-line scan without line analysis may be obtained by interrupting the electron beam in the camera tube 12 during the periods $T_{BB}$ in case of an increasing deflection current $D_I$ as is also effected during the periods $T_{BB}$ when the line flyback is effected.

FIG. 1 shows in one embodiment of the colour television camera the components with which the sequentially occurring signal parts of the composed signal C from the camera tube 12 can be separated and can subsequently be rendered simultaneously occurring. The reference numeral 18 denotes a circuit which consists of a clock pulse generator 19 and four frequency dividers 20, 21, 22 and 23 connected in series therewith. Clock pulse generator 19 consists of, for example an oscillator 24 and a clock pulse shaper 25 which is formed, for example, as a two-to-one divider. For, for example, the desired synchronisation purposes an input of the oscillator 24 is connected to an output of a frequency discriminator 26 to which at one end the line synchronizing signal $S_H$ from pulse generator 16 and at the other end a signal from circuit 18 is applied which has the standard line frequency denoted by $f_H$. Prior to an explanation regarding the clock pulse frequency of generator 19 and division numbers $f_1$, $f_2$ and $f_3$ adapted thereto of the respective dividers 20, 21 and 22 it is assumed that divider 22 provides a square-wave signal of line frequency $f_H$ and that divider 23 is active with a division number $f_4 = 2$ a 2-to-1 divider.

Outputs of the frequency dividers 21 and 22 of circuit 18 are connected to inputs of a pulse shaper 27. The pulse shaper 27 produces a signal which is denoted by P and whose shape is shown in FIG. 3. It will be described hereinafter how signal P is generated. FIG. 3 shows that the signal P has a short positively directed pulse having a period of $T_{PS}$ during a period which is equal to $T_H$ and a long negatively directed pulse having a period $T_P$. It is found that the period $T_{PS}$ lies between the periods $T_{HB}$ and $T_{BS}$ so that period $T_P$ is slightly longer than period $T_{HS}$.

The signal P from pulse shaper 27 is active as a switching signal for three change-of-state switches denoted by 28, 29 and 30 which for the sake of simplicity are shown as being active mechanically but are preferably formed electronically. An input of the controlled change-of-state switch 28 is connected to clock pulse generator 19 and another input thereof is connected to the subsequent frequency divider 20. Inputs of the controlled change-of-state switch 29 corresponding thereto are connected to ground and to the frequency divider 20. The references $Q_1$ and $Q_2$ denote the signals applied to switch 28 while the signal $Q_2$ only is given for switch 29. Switch 28 passes a composed signal Q shown in FIG. 3 which comprises clock pulses ($Q_1$) of higher frequency during the time $T_{PS}$ and clock pulses ($Q_2$) of lower frequency during the time $T_P$. In a corresponding manner switch 29 alternatively passes a reference potential, for example, ground and the signal $Q_2$. The switches 28 and 29 are connected for the purpose of controlling a signal expansion-delay stage 31 to an expansion unit 32 and a delay unit 33, respectively, present therein.

The single input of the controlled change-of-state switch 30 is connected to the output of the camera tube 12 conveying the composed signal C. A preamplifier which is normally present is not shown for the sake of simplicity. A first output of switch 30 is directly connected to an output 34 of three outputs denoted by 34, 35 and 36 of the colour television camera according to FIG. 1. The other output of switch 30 is connected to a signal input of the expansion unit 32. The output of expansion unit 32 is directly connected to two non-corresponding inputs of a two-fold, controlled change-of-state switch 37 and is connected through the delay unit 33 to two other inputs thereof. Two outputs of the two-fold, electronically formed change-of-state switch 37 constitute the two outputs 35 and 36 of the camera according to FIG. 1. For controlling the switch 37 this switch is connected to the frequency divider 23 of circuit 18.

Beside the change-of-state switch 30 times $T_{HS}$ and $T_{BS}$ are denoted near the said outputs. It follows from the signal P show in FIG. 3 with the times $T_P$ and $T_{PS}$ that the input of the switch 30 is connected to one of the respective outputs a time slightly longer than times $T_{HS}$ and $T_{BS}$. The result is apparent from signal C of FIG. 3, namely during a time $T_{HS}$ a signal $M_3$, $M_4$, $M_5$ or $M_6$ etc. is passed to the output 34 and during the times $T_{BS}$ signals $\bar{R}$ and $\bar{B}$ are alternately applied to the expansion-delay stage 31. FIG. 3 shows a signal M as it becomes available at the output 34.

When either the signal $\bar{R}$ or $\bar{B}$ is applied during time $T_{BS}$ to the expansion unit 32, the signal $Q_1$ with the high frequency clock pulses is applied thereto for the purpose of taking up. The unit 32 is formed, for example, in a manner not shown with a circuit of capacitors between which a transfer of charge can be effected through semiconductors controlled by the clock pulses. A unit of this kind is described as a so-called bucket-brigade delay line, inter alia, in U.S. Pat. No. 3,546,490. To understand the operation it is important that under the control of the clock pulses samples of the provided signal are taken which are successively shifted through the circuit of the capacitors. When shifting is effected so far that, for example, the signal still provided again becomes available at the output of the unit, this unit is active as a delay unit having a delay time which is equal to the signal shift time. It is alternatively possible to discontinue shifting after a signal has entirely been written in so that the capacitors in the circuit retain the signal samples in the form of charge. When subsequently shifting is effected in the same rhythm towards the output, the unit is likewise active as a delay unit or in case of longer discontinuation and at an arbitrary instant of reading out it is active as a store. It is then possible to write a signal with one given rhythm and, after it has been completely written in, to read it out with a different rhythm. Thus a signal expansion unit can be realised by performing a slower reading out after a fast writing in. FIG. 1 shows for the expansion unit 32 active in, for example, the manner described that writing in is effected during the time $T_{BS}$ and reading out is effected during the time $T_{HS}$, all this under the control of the composite clock pulse signal Q of FIG. 3. In FIG. 3 expanded signals $R_3$ and $R_5$ are shown at R, R′ which signals are derived from the compressed signal parts $\bar{R}_3$ and $\bar{R}_5$ of the signal C; the signals $\bar{B}_3$ and $\bar{B}_5$ derived from the signal parts $B_3$ and $B_5$ are shown at B, B′.

As during each pair of line periods $T_H$ the red and blue colour information is obtained only once, while that for the desired simultaneous signals is to be present each line period $T_H$, there is provided a delay unit 33 which is likewise formed as a bucket-brigade delay line. Under the control of signal $Q_2$ the delay unit 33 gives the signal R or B provided by the expansion unit a delay of the standard line period $T_H$. Simultaneously writing in of the provided signal R is effected as reading out of the previously taken-up signal B and vice versa. FIGS. 1 and 3 show the delayed signals with indices at the signals R, R′ and B, B′. The two-fold change-of-state switch 37 of FIG. 1 which under the control of the half-line frequency signal from frequency divider 23 is in one or the other position during successive line scan periods $T_{HS}$ causes the signal B′ or B to be present at the output 36 when the signal R or R′ is available at the output 35 of the camera.

In the manner described the colour television camera according to FIG. 1 generates the simultaneous picture signals M, $\bar{R}$ or $\bar{R}'$ and B′ or B shown in FIG. 3 starting from the composite signal C provided by the single camera tube 12 and having the sequential signal parts M, R and B. The picture signal M is not a normal luminance signal because it lacks 10 percent of the red and blue colour information occurring in the light from scene 1. By combination of the signal M with the signals R, R′ and B′, B in a so-called linear matrix the normal luminance signal can be obtained. Such an operation is, however, not required because a displayed scene results with good quality when the signal M in case of further operation such as gamma correction and in case of display is considered as the normal luminance signal. A great advantages is that for monochrome display the signal M can be used with the normal frequency range up to 5 MHz directly for the display and that a luminance signal need not be composed therefrom as is the case for a camera generating a red, green and blue colour signal. In that case the problem known for television occurs, namely the difference between a separately generated and a gamma-corrected luminance signal and a gamma-corrected composite luminance signal. The camera shown in FIG. 1 generates a signal M which provides a satisfactory compatability for colour and monochrome display.

Apart from the said advantages of the choice relating to the colour splitting in the optical means 2, it might be possible, if desired, to split up, for example, the light coming from scene 1 into the three colour-basoc components red, green and blue. The camera according to FIG. 1 could then generate a green colour signal G having a high frequency range instead of the signal M.

Relative to signal M having a high frequency range up to 5 MHz the signals R, R′ and B′, B have a low frequency range due in the first instance to the optical compression and in the second instance to the signal sampling performed at the expansion-delay stage 31. As is known this is not a great drawback because the eye is less sensitive to colour details upon display than to details in luminance. A frequency reduction of one eighth is the result from the optical compression with a compression factor of eight. In this case there applies for circuit 18 that in order to realize an eight-fold signal expansion with the aid of the signals $Q_1$ and $Q_2$ the frequency divider 20 must have a division number $f_1 = 8$. Generally there applies that the division number $f_1$ of divider 20 must be equal to the compression factor of compression-optical systems 3 and 4.

Starting from a frequency range which is acceptable for colour signals R, R′ and B′, B to approximately 0.5 MHz, further requirements follow for the circuit 18. It is known from the data technique that when a signal to be sampled occurs during a period T and a signal obtained by sampling must have a bandwidth W, 2T.W signal samples must be taken at a clock pulse frequency of 2 W. It follows that 52 samples are to be processed at a clock pulse frequency of 1 MHz if a 0.5 MHz signal in the line scan period $T_{HS}$ of, for example, 52 $\mu$s is to be obtained. Consequently signal $Q_2$ must have a clock pulse frequency of approximately 1 MHz while the signal $Q_1$ has a clock pulse frequency of approximately 8 MHz.

In this case the division number $f_2$ of the frequency divider 21 can also be determined. In fact, there must at least be 52 samples during the line scan period $T_{HS}$ to which end the pulse shaper 27 following the frequency divider 21 provides a switching signal P which retains the change-of-state switches 28 and 29 in the position for passing the signal $Q_2$. It follows therefrom that the product term of the division numbers $f_1$ and $f_2$ lays down the number of samples during the period $T_{HS}$. Since there applies that $f_1$=8 and $f_1 f_2$ is at least 52, there follows that $f_2 = 7$ so that 56 samples are processed.

If $f_2$ were chosen to be 8, there would be 64 samples within 52 $\mu$s which would lead to a bandwidth of approximately 0.6 MHz at a clock pulse frequency of approximately 1.2 MHz in the signal $Q_2$.

The following applies to determine the division number $f_3$ of the divider 22. For a compression factor which is equal to eight the pulse shaper 27 must apply a switching signal P to the change-of-state switches 28 and 29 such that they are in the position shown during one ninth of each line period $T_H$ and are in the other position during eight ninth for obtaining the eight-fold expansion. Generally there applies that $f_3$ = compression factor + 1 = $f_1 + 1$ and consequently $f_1 = 8$ $f_3 = 9$.

In the foregoing 52 $\mu$s have been mentioned for the line scan period $T_{HS}$. This period occurs in television systems which operate in accordance with the CCIR standard. For the purpose of illustration the following survey shows some periods as they may be chosen in the CCIR standard. For other standards adapted, slightly different periods may be taken.

SURVEY

Periods and frequencies associated with FIG. 3 and with the CCIR-standard:

$T_H = 62$ $\mu$s, $T_{HS} = 52$ $\mu$s, $T_{HB} = 12$ $\mu$s $T_{BS} = 6.5$ $\mu$s, $T_{BB} = 2.75$ $\mu$s.

Scanning one line: $T_{HS} = 52$ $\mu$s.

Scanning other line: $T_{HS} + 2\ T_{BB} + 2\ T_{BS} = 70.5$ $\mu$s.

$T_{PS} = 1/9\ T_H = 7.11$ $\mu$s. $T_P = 8/9\ T_H = 56.89$ $\mu$s. Frequency $Q_1$ = 7.875 MHz obtained from oscillator 24 with frequency 15.75 MHz through pulse shaper, two-to-one divider 25.

Frequency $Q_2$ = 0.984375 MHz.

The foregoing only describes an optical compression in the line scan direction. A compression transversely thereto may of course alternatively be performed. However, scanning then becomes more complicated than in the described case in which there are no extra steps necessary for field scanning in the vertical direction. In case of compression in the vertical direction an adapted vertical deflection is required.

Since the compressed images are located on either side of the normal non-reduced image and the compressed images are scanned every other line, the signals $\bar{R}$ and $\bar{B}$ obtained can be sequentially processed through one expansion-delay stage 31, and may become available as simultaneous signals R, R′ and B′, B through the change-of-state switch 37. In fact, between generation of the two signals $\bar{R}$ and $\bar{B}$ there is a period of time of the line scan period $T_{HS}$ during which the signal expansion can take place before the next signal is provided. If the two compressed images were located on the same side of the normal image, the given embodiment employing one expansion-delay stage 31 would be impossible, but there would have to be two stages, one for each signal to be expanded.

Although the described embodiment of a colour television camera according to the invention employs two compression optical systems 3 and 4, it is alternatively possible to use only one compression optical system in colour television systems which are not based on three but on two basic colours such as the so-called Land system.

The data supplied by the manufacturers of camera tubes include the recommended image scan surface on the target plate. The scan surface is, for example, 17.1 by 12.8 mm for the conventional width-height ratio of 4:3 for a 30-mm diameter tube and 12.8 by 9.6 mm for a 25-mm diameter tube. A diameter of the recommended scan surface of 21.5 and 16 mm, respectively, corresponds thereto. FIG. 2*b* shows that not one image, but two compressed ($\bar{R}$, $\bar{B}$) and one non-compressed (M) image are projected on the camera tube 12. In principle there are two approaches, namely going beyond the diameter of the recommended scan surface or remaining within it for which in both cases the 4:3 width-height ratio for the non-compressed image is to be maintained.

The following applies when the diameter of the recommended scan surface is exceeded. The given (CCIR) survey shows that the total line scan has increased by a factor of 70.5:52 = 1.36. Starting from the use of the given recommended scan surface for the noncompressed image, there follows for the unchanging height at 1.36 times larger width of the scan surface which for the 30-mm diameter tube yields a width of 23.2 mm and for the 25-mm diameter tube yields a width of 17.4 mm.

When it is desired to remain within the diameter of the recommended scan surface, a calculation shows that there applies that the width and the height of the non-compressed image is to be reduced by a factor of 0.81 relative to the recommended values. The compressed images then fall within the circle of the said diameter. For the non-compressed image a region having a width and a height of 13.9 by 10.4 mm follows for the 30-mm diameter tube and of 10.4 by 7.8 mm for the 25-mm diameter tube.

Both possibilities concerning the choice of the size of the scan surface used and alternative shapes thereof may be used independently of the circumstances in which the camera is used. An enlargement of the scan surface used has the advantage of a better definition in case of signal display, but it has the drawback that stronger inertia phenomena and larger deflection errors during signal generation occur outside the recommended surface. When picking up a scene having moving parts the inertia phenomena cause comet tails to appear behind the components upon display. When remaining within the recommended diameter of the useful scanning surface the result is that the central image analysed during the standard line scan period produces a signal having a lower frequency range. Starting from the said range of 5 MHz a range of 4.2 MHz theoretically results for the given reducing factor of 0.81. The horizontal definition corresponding hereto upon display is by all means acceptable especially when a single-tube colour television camera intended for recreation purposes and for outdoor reporting is considered.

What is claimed is:

1. A color television camera for providing a signal in accordance with a selected standard comprising an optical means for projecting differently colored images and for spatially compressing at least one of said images by a selected compression factor, a pick up device means disposed proximate said optical means and having an input means for receiving said projected images and an output means for providing a line and field scanning output sequential electrical signal of said images, said compressed image being provided by said output means during at least part of a normal line blanking time of said selected television standard and an uncompressed image being provided by said output means during the normal line scanning time of said standard, and a signal expansion-delay stage having an input coupled to said pick up device means output for receiving said sequential signal and an output means for providing a simultaneous television signal in accordance with said standard.

2. A colour television camera as claimed in claim 1, wherein the optical means comprises two compression optical systems and two colour filters, each filter having a different light transmission characteristic, each compression system providing a compressed image in the line scan direction near the non-compressed image.

3. A colour television camera as claimed in claim 2 wherein the compression optical system provides a reduction of the image in one direction.

4. A colour television camera as claimed in claim 2, wherein said two compression-optical systems provide the compressed images on either side of the non-compressed image as considered in the line scan direction.

5. A colour television camera as claimed in claim 4 further comprising a deflection generator disposed about the pick-up device and having a different scan time duration during alternate lines and during each line the scanning time of the-non-compressed image is the standard line scan period and every other line the scanning of the compressed images present on either side is during part of the standard line blanking period.

6. A colour television camera as claimed in claim 5, further comprising a first controlled change of state switch having an input and first and second outputs, the pick-up device output being coupled to said input of said controlled change-of-state switch which input is connected during at least the standard line scan periods to said first output, an output of the camera coupled to said first switch output, said input being connected during part of the standard line blanking periods to said second output said second output being connected to the expansion-delay stage input, said stage having two outputs one comprising means for conveying an expanded signal and the other comprising means for conveying a signal delayed during one line period, a second controlled two pole two throw change-of-state switch having two inputs coupled to said one stage output, two other inputs coupled to said other stage output, and two outputs comprising second and third outputs of the camera conveying colour signals suitable according to the standard.

7. A colour television camera as claimed in claim 6, wherein the expansion-delay stage comprises an expansion and a delay unit which are each controlled through clock pulses and comprise controlled semiconductors and capacitors disposed between said semiconductors. said units and the controlled change-of-stage switches each comprise a control input, and a control circuit comprising a clock pulse generator and frequency dividers connected to said control inputs.

8. A colour television camera as claimed in claim 7, further comprising a third controlled change-of-state switch having an output coupled to said expansion unit and two inputs said control circuit includes a first frequency divider connected between said two inputs of the third change-of-state switch, the division number of said frequency divider being equal to said compression factor.

9. A colour television camera as claimed in claim 8, further comprising a fourth controlled change-of-state switch coupled to said delay unit, to a reference potential and to the said control circuit, the control circuit being connected to the said frequency divider.

10. A colour television camera as claimed in claim 8 wherein said said control circuit comprises a plurality of serially coupled frequency dividers, the last divider comprising a two-to-one divider means for providing a half line frequency to the said two-fold change-of-state switch, a penultimate frequency divider has a division number equal to one plus the compression factor, a pulse shaper having inputs coupled before and after the penultimate frequency divider of the control circuit and an output means connected to the said third and fourth single-fold change-of-state switches for providing a switching signal.

11. A colour television camera as claimed in claim 10, wherein said control circuit includes a frequency divider coupled between the first and the penultimate frequency divider and has a division number which upon multiplication of the said compression factor produces a product term which is at least equal to a product term of twice the line scan period and a desired bandwidth of the said of colour signals to be applied by the camera to the outputs.

* * * * *

PO-1050
(5/69)

UNITED STATES PATENT OFFICE
CERTIFICATE OF CORRECTION

Patent No. 3,823,260 Dated July 9, 1974

Inventor(s) WILLEM VAN DEN BUSSCHE

It is certified that error appears in the above-identified patent and that said Letters Patent are hereby corrected as shown below:

IN THE TITLE PAGE change "71.16690" to -- 7116690 --;

Signed and sealed this 8th day of October 1974.

(SEAL)
Attest:

McCOY M. GIBSON JR.
Attesting Officer

C. MARSHALL DANN
Commissioner of Patents